United States Patent [19]
Buzzell

[11] Patent Number: 5,303,504
[45] Date of Patent: Apr. 19, 1994

[54] SYSTEM FOR HARVESTING MAPLE TREE SAP AND APPARATUS USED THEREIN

[76] Inventor: George L. Buzzell, R.F.D. No. 2, Newport, Vt. 05855

[21] Appl. No.: 936,669

[22] Filed: Aug. 28, 1992

Related U.S. Application Data

[62] Division of Ser. No. 547,172, Jul. 6, 1990.
[51] Int. Cl.⁵ .............................................. A01G 23/10
[52] U.S. Cl. ......................................... 47/52; 285/93; 285/156; 285/61
[58] Field of Search ................... 47/50, 51, 52, 53, 54, 47/10, 11, 12; 285/93, 156, 61

[56] References Cited

U.S. PATENT DOCUMENTS

| | | | |
|---|---|---|---|
| 3,046,698 | 7/1962 | Breen | 47/52 |
| 3,841,668 | 10/1974 | Williams | 285/93 |
| 4,238,131 | 12/1980 | Cleveland | 285/156 |
| 4,299,053 | 11/1981 | Foote | 47/52 |
| 4,512,104 | 4/1985 | Lamb | 47/52 |
| 4,971,366 | 11/1990 | Towsley | 285/196 |

FOREIGN PATENT DOCUMENTS 1096637  3/1981  Canada ................... 47/50

OTHER PUBLICATIONS

Lamb Naturaflow 14 pages and dated 1964.

*Primary Examiner*—Henry E. Raduazo
*Attorney, Agent, or Firm*—Herbert L. Gatewood

[57] ABSTRACT

A system for collecting sap from maple trees in which is provided a family of interchangeable connectors or fittings providing quick connect/disconnect features, and a spout member providing for more straight line flow of sap through such a member. An assembly is provided of a male and a female member which allows quick connection of branch lines together, or a branch line to the main line conduit. A drop line assembly is provided which allows for better tapping of sap producing trees to maintain healthy trees. A cap is provided constituting one member of the quick connect/disconnect assembly whereby any part of the sap collection system can be isolated from the rest or for providing a closed system for cleaning or selected from the environment. Adaptors are provided which incorporate the features of the quick connect/disconnect assembly making it possible to convert old sap collecting systems to one using the connectors and fixtures having the quick connect/disconnect features.

5 Claims, 4 Drawing Sheets

SYSTEM FOR HARVESTING MAPLE TREE SAP AND APPARATUS USED THEREIN

This is a division, of application Ser. No. 07/547,172 filed Jul. 6, 1990.

BACKGROUND OF THE INVENTION

1. Field of the Invention

This invention relates, in general, to a system for harvesting sap from sap producing trees, e.g., maple trees, and to apparatus used therein. More specifically, it relates to a novel spout member and to various apparatus components comprising a family of quick connect-/disconnect fittings or connectors and to adaptors suitable for use in a closed sap collection system comprising lengths of interconnected flexible plastic tubing. Furthermore, it relates to a kit for use in the installation of a sap collection system comprising a novel spout member and a plurality of various such fittings, adaptors and lengths of flexible plastic tubing.

2. Description of the Prior Art

The harvesting, or collecting, of sap from maple trees for the production of maple syrup and sugar was learned by the early colonists in New England from the Indians. Such harvesting has become an ever increasing important industry in New England and is practiced in Vermont and New Hampshire, among other of the states in the United States. Collecting sap from maple trees and manufacturing syrup therefrom comprises a significant and major source of income for thousands of people in the United States and Canada, and in certain other countries in the world. Accordingly, it is important that the trees in a grove of maple trees, or sugarbush, be kept in a continuing health condition.

In early days, the maple sap was collected in a bucket hung beneath a spout or tap inserted into an elongated dead bore provided in the trunk of the maple tree. The sap was then collected from all the buckets in the sugarbush and brought to a sugar house centrally located in the grove of maple trees for boiling to produce the syrup and sugar. This manner of harvesting the sap is, as will be well appreciated, an extremely labor intensive operation. As a result of such a collection system, the commercial harvesting of sap from maple trees became an ever increasingly uneconomical operation, particularly as the labor costs connected therewith increased over the years. Thus, there developed relatively early on in commercial sap operations the need for a more cost effective means of collecting sap for processing into maple syrup and sugar.

Sap collecting systems involving conduits or pipes for conveying the sap from trees in the sugarbush to a remote collection point for processing were known at lest as early as the earlier part of the present century. Such an early sap collection system is disclosed in U.S. Pat. No. 1,186,741, which issued to Brower on Jun. 13, 1916. In that patent, there is disclosed a sap collecting system which comprises a main conduit to which is connected a plurality of branch conduits. To the branch conduits are connected branch pipes which in turn are connected to upright branch tubes extending vertically downwardly from a spile located in a borehole provided in the tree trunk. Thus, sap is conveyed from the tree via the spile down the upright branch tube to a branch pipe, hence to a branch conduit, then to the main conduit, and ultimately to the collection point for further processing. The main conduit, as disclosed by the patentee, is manufactured of sheet metal bent to form a tubular structure. At desired locations along the main conduit, the metal strips of which the conduit is constructed is bent upwardly to provide a flange which defines an opening for intrusion of the end of the branch pipes. Similar openings are provided in the branch pipes and branch conduits for intrusion of the lower end of an upright branch tube. Although the system disclosed in U.S. Pat. No. 1,186,741 is deemed to be somewhat of an improvement over the use of buckets for collecting sap from the maple trees as earlier done, it will be appreciated from a review of the patent that such collection system is attendant with certain problems. The openings provided for location of the ends of the branch tubes and branch pipes are not sealed, leaving the sap being collected subject to contamination by insects, dirt, and foreign materials.

Other sap collecting systems involving interconnected conduits are disclosed in U.S. Pat. Nos. 2,877,601; and 4,366,648. The patentee in U.S. Pat. No. 2,877,601, discloses that early tree-to-tree collection systems involved open troughs and somewhat later ones comprised a network of piping (believed by applicant to be similar to that disclosed in U.S. Pat. No. 1,186,741). Nevertheless, based upon the disclosure in U.S. Pat. No. 2,877,601, little, if any, improvements had been made in tree-to-tree collection systems from the time of those earlier inventions to that invention disclosed in U.S. Pat. No. 2,877,601, which issued on Mar. 17, 1959. As disclosed in U.S. Pat. No. 2,877,601, the open trough systems were exposed to foreign substances blown about by the wind which substances had to be removed before processing the sap. Also, the troughs were damaged by falling limbs and traversing of deer and other animals through the woods. As a result, such systems were, as disclosed by the patentee, unsuccessful. The early piping networks were also, according to the patentee, attendant with certain problems in addition to being subject to damage by falling trees and animals passing through the sugarbush. Thus, the pipes were damaged by expansion of the sap on freezing. And, with warmer weather, the sap took to long to thaw out. As a result, the new flow of sap would spill to the ground until the pipes thawed.

In U.S. Pat. No. 2,877,601, the patentee discloses a sap collection system which comprises a main or trunk line and branch lines interconnected together, which lines simply are laid on the ground. Trees are connected one to another, in serial fashion, by branch lines connected one to the other, the end one of which connects into the main line. Each tree is provided with a fitting which is basically a Tee-connector. Thus, there is provided a tubular section extending horizontally from the body of the connector which extends into the borehole provided in the tree trunk at one end thereof and into a bore in the body member at the other end. A horizontally disposed tube provided with a side opening at its mid-point extends through the body member and perpendicular to the first tube, to the opposite ends of which are connected the ends of branch lines from adjacent trees. Thus, accordingly to the patentee, other is provided a closed sap collection system which has the advantage of appreciably curtailing bacterial slimes and preventing bacteria laden air from coming into contact with sap. The branch and main line tubing are formed of a somewhat flexible synthetic plastic material, according to the patentee, such as polyethylene or vinyl resin. As a result, the sap in the collection system is less subject to freezing and thaws out quicker by constructing the system, as disclosed by the patentee, of a dark material, e.g., black tubing, having relatively high solar heat absorbing properties. Nevertheless, the use of such a sap collection system is necessarily accompanied with certain problems. Thus, as will be appreciated, as the branch and main line tubing are provided of somewhat flexible material, and such tubing is laid directly on the ground, the tubing of the system will conform to the contours of the ground on which it is laid. As a result, the collection system will naturally develop sags therein, in certain locations, allowing stagnate sap areas to develop. Sags in such a flexible tubing system will become permanent collecting points for sap. With cold weather in the spring during the sap harvesting, the stagnant sap may even freeze causing an obstacle to sap flow until the blockage thaws out. When the weather becomes warmer, the stagnant sap may become a "hot-bed" of bacterial buildup which contaminates the sap, lowering its quality grade and value. As disclosed in U.S. Pat. No. 4,512,104, maple sap will become rancid if it is allowed to stagnate in any one place for a relatively short period of time. Care must then be taken, even when the sap is running, to avoid low regions in the lines where the sap might stagnate and eventually spoil. Rancid sap contained in the lines carrying the sap can even contaminate running sap passing through the infected regions and thus degrade or even spoil an entire production run. In any event, sags are counterproductive to the total collection system which works best and produces higher volumes of sap when there are no sags to reduce flow efficiency. The greater the number of such sags and stagnant sap areas that develop in a sap collection system, the greater the potential of the problems just described. Moreover, as disclosed in FIG. 2 in the U.S. Pat. No. 2,877,601), the flexible tubing is merely connected to the Tee-coupling by a friction fit resulting from sliding the end of the tubing over the smooth end of the tubing connector of the coupling. Thus, it is believed that such a connection is obviously limited in the pressure that it can withstand, during the sap harvesting or in the cleaning of the system by reverse flushing or the like methods, prior to separation.

U.S. Pat. No. 4,366,648 likewise discloses a tree sap collection system which comprises a main conduit extending through a grove of trees with branch conduits extending from the main conduit to each tree. The branch conduits are connected to the main conduit through a coupling which includes a plurality of equiangularly spaced-apart connectors with each connector connected to the end of a separate branch conduit. Each branch conduit terminates at the end opposite from the main conduit in a Tee-coupling provided with three elongated connectors, one of which is connected by a length of tubing to a spout which, during the sap collection period of time each year, is located in a borehole provided in a tree. At the end of the sap collection period, the spouts are extracted from the boreholes, and each spout is then plugged, in accordance with the invention disclosed in that patent, to prevent the entry of foreign materials, such as dirt or insects, on the conduit system. It is not clear from the disclosure of the patent whether the main and branch conduits are laid on the ground. The patentee does not, however, expressly disclose that the conduits of the system are supported above-ground. Moreover, the Tee-couplings do not appear from the disclosure in the drawings in the patent to be attached to the trees. They appear to be located on the ground further indicating that the tubing in the collection system is laid on the ground. Thus, it would appear that, just like the collection system disclosed in U.S. Pat. No. 2,877,601, this collection system may be attendant with the same problem of sags in the lines and stagnant areas of sap collecting in the tubing system. In any event, the patentee discloses that the tree sap collection system is intended to remain installed throughout the year with only the spout which was inserted within each tree, being removed. Cleaning of the system, according to the patentee, is accomplished with the system in place, as initially installed, by forcing cleaning fluid in a reverse direction to sap flow through the system.

Although the apparatus of the invention disclosed in U.S. Pat. No. 4,366,648 advantageously provides a closed system and protects the sap in the tubing from contamination by foreign objects, its use nevertheless presents other problems and difficulties. As disclosed in the patent, and seen in the drawings, the various connectors on the various components connecting the tubing involves a plurality of spaced-apart annular ribs. Such connectors, however, while providing for tight, secure connections between the tubing and the connectors, do not allow for ready and easy removal of the tubing from the connector, e.g., where cleaning of portions of the system may be desired, or in cases where lengths of conduit need be replaced with conduit of a different length or changed for some reason, or the drop line from the spout need be replaced with a shorter or longer length. In most instances where the connectors are provided with such annular ribs, the tubing must actually be cut off the connector. This not only destroys the ned of the tubing, sometimes necessitating its disposal or at least replacement with another length of tubing but oftentimes this results in damage to the connector, necessitating the replacement of the connector. Such problems naturally add to the cost and expense in the operation and maintenance of the sugarbush. The difficulty experienced with such tubing removal is one reason why some sugarbush operators are reluctant to take down the sap collection system, or any part thereof, for storage or cleaning, or for the thinning of the sugarbush, or for any other reason.

U.S. Pat. No. 4,299,053, which issued on Nov. 10, 1981, discloses that it is conventional practice to remove the sap spouts from the trees after each sap season so that the healing of the boreholes will take place. New boreholes are then drilled and spouts inserted in them in subsequent seasons. In order to reduce the amount of labor associated with disconnection and reinstallation of the plastic tubing sap collection system, it is usual practice t hang the partially disassembled system from the trees in the maple grove. Because prior art sap collection systems have not been designed with this mode of use in mind, according to the patentee, two significant problems have occurred. First, because either a prying tool or a hammer must be used to remove prior art plastic spouts from the tree bore holes, a substantial amount of spout breakage occurs during such removal. Second, storage of the sap collection systems having on the trees has allowed contamination to enter the partially disassembled system through openings in them, e.g., the open end of the spout. For example, mud wasps will often plug up the spouts if they are left open and hanging on the trees. Although this latter problem has been alleviated somewhat, according to the patentee, by providing separate plastic plugs for insertion into the openings, the necessity for a separate part adds inconvenience to the use of the system. A further problem associated with some prior art plastic plugs, as disclosed by the patentee, arises when the system is cleaned by forcing water through it. The plastic plugs are blown out of the openings with even a small amount of water pressure. This hampers the cleaning operation making such more time consuming, costly and difficult.

Accordingly, there is disclosed in U.S. Pat. No. 4,299,053, a member comprising in combination a connector and plug for use in a sap collecting system in which a length of plastic tubing, i.e., a drop line, is connected at one end thereof to a spout inserted in the borehole provided in the trunk of a tree and at the other end to the connector member. This member, as disclosed in the patent, is in the shape of a Tee-connector which is provided with three fittings, two of which are horizontally disposed and in direct opposition to one another, and the other of which is vertically disposed downwardly. An axial passageway is provided in the downwardly extending fitting which intersects with an axial passageway defined by the other two fittings. In opposition to the downwardly projecting fitting on the member is a tab in which is provided a hole through which a nail may be inserted to mount the connector member to the trunk of a tree, as a part of the collection system. Extending outwardly from the body of the combination connector and plug is a cylindrically shaped plugged for engaging the open end of the spout, when such is removed from the borehole, at the end of the sap collection season. The spout, as disclosed in the patent, is provided with a downwardly projecting elongated fitting which is connected to the downwardly projecting fitting on the Tee-connector member by means of plastic tubing forming a part of the collection system. Thus, sap coming into the open end of the spout flows through the spout, down the fitting projecting downwardly therefrom through the tubing connected to the Tee-connector and out the down-side horizontally disposed fitting of the Tee-connector through a branch line connected thereto, to a main conduit. When the sap collection season is over, the spout is removed from the borehole in the tree, and the open end thereof is fitted onto the plug. Thus, there is provided a closed loop in the system allowing the system to be cleansed by back flushing with water. As the borehole provided in the tree is left exposed to the air, normal healing of the borehole takes place after the sap collection season. In a subsequent season, a new borehole is provided in the tree trunk, and the spout is inserted into the new borehole in conventional manner. Although the invention disclosed in this patent has certain advantages, its use is accompanied by at least some of the same problems earlier disclosed. The drop line obviously has a sag therein during the sap harvesting season, as will be readily appreciated by reference to FIG. 3 of the drawing, which is undesirable. Moreover, the annular ribbed fitting son the connector member make removal of the plastic tubing therefrom extremely difficult, as earlier disclosed.

U.S. Pat. No. 4,512,104, earlier mentioned, discloses a drop line assembly for use in a sap collection system. The drop line assembly comprises a molded tap, or spout member, which comprises a housing having a front face from which protrudes an elongated tapered spout and a bottom from which extends downwardly an elongated drop line connector. The spout member and drop line connector each define axially aligned passageways which intersect with one another inside the housing. As disclosed by the patent (FIG. 3), the inner end of the passageway in the elongated fitting intersects the passageway defined by the tapered spout at an angle of approximately 90 degrees adjacent its end. Thus, the portion of the spout passageway extending beyond the intersection with the passageway in the elongated fitting serves as a collection point for wood particles which on buildup can cause a flow blockage necessitating cleaning. The other end of the elongated fitting is connected to one end of a flexible tubular-shaped drop line, the other end of which line is connected to a conventional Tee-connector. The other connectors on the Tee-connector are each connected to branch lines connected in turn to adjacent trees from which sap is being collected. As disclosed by the patentee, the elongated connector on the spout member is provided with a series of circumferential ribs that are adapted to engage the interior of the end of the drop line tubing in gripping engagement to establish a leak-tight joint therebetween. Thus, while the drop line advantageously appears to hang directly downwardly thereby preventing sags therein with attendant potential for stagnant sap areas, when flow cases for a time, or at least slows down, the problem presented by the ribbed connectors, as earlier disclosed, remains. These ribs prevent not merely inadvertent dislodgement of the drop line from the spout, as suggested by the patentee, such circumferential ribs make disconnection of the drop line from the connector most difficult, and essentially impossible without use of a knife, or other cutting tool, to first slit the tubing longitudinally at the end. The ribs, as disclosed in the patent, slant downwardly toward the end of the connector allowing the end of the tubing to be relatively easily slipped thereover. Once in place, however, the ribs grip the interior surface of the tubing making removal of the tubing from the connector most difficult.

The advent of interconnected tubing systems for collecting sap has had a significant impact on site selection, thinning and tapping procedures. For example, prior to use of tubing systems, the trees in extreme swampy areas were not generally tapped. The sap could not be readily connected from such trees and collection, in general, was not economically justified as such areas do not usually produce healthy trees, or good volumes of sweet sap. The use of tubing systems, however, allows relatively easy gathering of sap from such areas.

The proper thinning of trees from a sugarbush is absolutely essential to the process of establishing and maintaining a healthy, productive sugarbush. Too much thinning, no thinning, or poorly timed thinning all contribute to poor tree health. Tubing collecting systems as above-described, however, are considered to be a real pain to take down from time-to-time for thinning. The collection systems as disclosed, or even portions thereof, cannot be readily or easily disassembled, due to the ribbed connections on fittings now conventionally used. As a result, many stands of maple trees are not thinned at all. Others when thinned, are "over-thinned", to avoid having to take down the tubing system and to re-install it more often than is absolutely necessary. Nevertheless, usually, frequent, light thinning is best in well managed sugarbushes. This requires frequent handling of the tubing. Thus, for proper thinning of a sugarbush and continued good maintenance thereof, to promote continued productive and healthy trees, there is a real need for tubing fittings and connectors that reduces not only the difficulty in taking down a tubing system, or disassembling potions thereof, but makes such a system also more easily and readily installable.

Furthermore, the proper tapping of individual trees in the sugarbush so as to maintain healthy trees and continued good sap productivity therefrom requires that one determine the number of taps that a tree can support at any one time and from time-to-time, and then that such taps be distributed from time-to-time over as large an area of tappable wood as possible. Distributing these "allowable" tapping injuries to a tree properly will keep them separated from each other by larger areas of healthy white wood. As a result, the tree will be better able to continue (normal sap flow) functioning. Thus, for good tree management, the length of a drop line, i.e., the length of tubing from the spout to the Tee-connector or to a branch line or conduit carrying the sap from one tree to the next, and hence to the main line, will need vary from time-to-time to accommodate the most desirable location for a newly tapped borehole. Nevertheless, this replacement of one length of drop line for another is not readily accomplished due to the difficulty in removing a particular length of drop line from the spout member in the sap collection system. As before disclosed, with the tubing connectors or fittings presently conventionally used, the plastic tubing cannot be, generally, readily removed therefrom. The drop line tubing must be cut at one end from the spout, and at the other end from the branch line Tee-connector, and often with much difficult. Due to the difficulty involved in exchanging a shorter or longer length of drop line for that already installed in the collection system, drop lines that are really too short, or in some cases too long, for good tapping procedures nevertheless continue to be used from year to year. Thus, in cases where the drop line is too short, tap hole location is determined largely by the length of the top line then being sued. In other words, the tap hole location is determined by "brining the tap to the spout". This results in a clustering of tap holes, causing serious health problems to the tree and has contributed heavily to tree dieback and decreased sap productivity from a particular tree. With such problems, the overall productivity of the sugarbush is adversely affected to a great degree.

Where, on the other hand, to avoid clustering of tap holes from continuous use of too short a length of drop line, a producer uses too long a length of line for the present location of tap hole, a sag in the line is often the result. This, of course, results in stagnant sap and the attendant problems earlier disclosed.

The minimum drop line length that should be used is at least 30 inches. Such a generous length of drop line will allow vertical staggering as well as horizontal offsetting of new tap holes. This long a drop line can be kept from forming a sag below the lateral lines, i.e., the branch lines, by tying it back when tapping at a point closer to the Tee-connector so that the flow is directed downwardly from the tap to the connector. Nevertheless, one should be prepared to move the laterals, i.e., branch lines, where possible, or change the drop line lengths, or a combination of both to utilize as much of the tapping band in the tree as possible. New taps should be placed at least six inches to one side and two feet above or below any old taps which are still open.

In the commercial harvesting of maple sap used in the production of syrup, it is not uncommon for the producer to have hundreds or event thousands of taps working at any one time. Once a sap collecting system is installed in a sugarbush or farm, as is presently done, and with the ribbed fittings disclosed in the above-mentioned prior art patents, it is very difficult to alter the configuration of that system in any way. Also, though highly desirable, it is most difficult to disassemble the system, or any part thereof, for cleaning. As a result of these difficulties, it is not at all unusual for the collections system to be left on the trees from year-to-year. When first installing a sap collecting system, the drop lines from the spout to the Tee-connector located in the branch lines are provided of a certain length. The same is true of the branch lines, which connect tree-to-tree, and ultimately connect into a main line or conduit. Thus, if any changes are to be made in the initial configuration, these lengths must be taken into consideration. At times, changes to the system can only be made by replacing certain of the drop lines, or of the various and numerous branch lines. Presently, however, any modification of any tubing system of which I am aware involves using a knife or other cutting instrument to remove drop lines from spouts and drop lines or branch lines from connectors to which such are connected in the collection system. This process is not only most difficult to accomplish because of the nature of the fittings involved, but is also time consuming and inconvenient. Moreover, it often results in costly damage to the connector fittings, with resulting loss of sap productivity because of such damage to the fittings, if such damaged fittings are not replaced. All of the above naturally contributes to the cost of the operation of the sugarbush and in the resulting products.

The difficulty of modification, and the attendant problems, as above-disclosed, causes many sugarmakers to avoid any modifications to the collection system, once such is installed in the sugarbush, and to ignore such problems and any needed changes in the system until absolutely necessary. As a result, the overall health of some sugarbushes has deteriorated more each year, and some have deteriorated to a great extent, and will continue to further deteriorate unless the trees in the sugarbush are properly tapped and the sugarbush itself properly thinned from time to time. The result of not doing so is not only a reduction in the quantity of sap collected from a sugarbush from year to year but also the quality of the sap in any one year as well which, in turn, adversely affects the finished product, e.g., the maple syrup. The presence of bad wood or decayed wood from previous improperly tapped trees can adversely affect sap quality, manifesting itself in a serious off-flavor in the syrup produced. The loss to the sugarbush owner in tree health, product yield and quality in improper tapping and thinning is expensive; however, the loss of trees from such practice is of even more concern.

Existing collection systems as above-described, while an improvement over bucket and hand gathering systems, still are attendant with many problems, as will, it is believed, by readily appreciated from the above. Thus, there is a need for a sap collection system that addresses the need for good and continued tree health. Moreover, there is a need for such systems that provide for greater ease and convenience not only in their installation, but in their maintenance and modification, resulting in economies in labor and in improved production of sap of good quality and flavor.

SUMMARY OF THE INVENTION

A major object of the present invention is to provide an improved system for collecting sap from sap producing trees, in particular maple trees, not attendant with the problems of present sap collection systems.

Another object of the invention is to provide a sap collection system that offers greater convenience in, and allows for, more proper tapping of maple trees.

A further objects is to provide a sap collection system, the use of which will result in less tree-dieback and healthier trees through less overtapping and fewer improperly tapped trees.

A further object is to provide a sap collection system that offers greater convenience and efficiency in proper thinning of trees from a sugarbush from time-to-time.

A still further object of the invention is to provide a sap collection system that can be readily and easily assembled or disassembled, as desired, and without the need for cutting or other external tools.

Still another object of the invention is to provide a sap collection system wherein one or more parts of that system can be readily and easily isolated from the whole, to allow the further tapping of any particular tree, or the tapping of certain trees to be put off until another reason, or for whatever the reason.

A still further object is to provide a sap collection system that includes apparatus that facilitates its installation and maintenance.

An even further object of the invention is to provide a sap collection system that can be readily disassembled for storage or cleaning after the end of the sap collections season, and more readily and easily installed the following season in the same grove or another, as desired, than such systems now existing.

A further object of the invention is to provide a sap collection system that is closed system whereby bacterial slimes are appreciably curtailed by preventing bacteria laden air from coming into contact with the sap.

A further object is to provide a sap collection system that is air and water tight and that can withstand pressures in the area of 100 lbs./in.$^2$.

A further object of the invention is to provide a sap collection system that can be cleaned while still installed in the sugarbush by, if desired, isolating predetermined portions thereof and reverse flushing the same with suitable cleaning fluid.

A further object is to provide a drop line assembly for use in a sap collecting system facilitating and making more convenient the proper tapping of maple sugar trees whereby the tendency for cluster tapping in a tree will be reduced.

Another object of the invention is to provide a novel spout member for use in a sap collection system.

A further object of the invention is to provide a family of connectors or fittings that facilitates the installation of a sap collection system and that offers convenience and efficiency in the maintenance, modifications, and disassembly thereof.

A further object of the invention is to provide a family of connectors or fittings that mate together and which provide in combination positive locking features that prevent their inadvertent separation from one another.

A still further object is to provide suitable adaptors for use in presently installed sap collection systems in which the tubing connectors comprise circumferential ribs whereby such a system can incorporate the family of quick connect/disconnect fittings or connectors of this invention.

Another object is to provide a kit comprising a plurality of the quick connect/disconnect assemblies and connectors and fittings disclosed herein, drop line assemblies, and lengths of plastic tubing for installation of a sap collections system in accordance with the major aspects of the invention.

A further object is to provide a quick connect/disconnect assembly for facilitating the connecting together and disconnecting of two lengths of flexible plastic tubing or the like.

In accordance with the major objects of the invention, there is provided, according to one aspect thereof, an air and water tight interconnected system for collecting sap from sap producing trees, in particular, maple trees, and delivering such to holding tanks for later processing which comprises a main line conduit having an axially disposed passageway therein for transporting sap from a plurality of branch line conduits to a holding tank, said main line conduit comprising at least a first section of predetermined length of flexible plastic tubing having a downstream end and a second section of predetermined length of flexible tubing having an upstream end, an elongated manifold connector having an axially disposed passageway herein and having an upstream end and a downstream end for connecting the said downstream end of the said first section of main line conduit to the said upstream end of the said second section of mainline conduit, a plurality of fittings being provided on said elongated manifold connector, each of said fittings comprising one member of a quick connect/disconnect assembly and having an axially disposed passageway therein intersecting with said passageway in said elongated manifold connector, said fittings being preferably all located in the same plane and extending outwardly from said manifold connector in spaced-apart paris in opposition to one another along its length, a plurality of Tee-connectors each being detachably connected to the trunk of a plurality of maple sugar trees, each of said plurality of Tee-connectors being located at a predetermined suitable vertical distance above the ground, each said Tee-connector comprising a body member defined by top and bottom, horizontally disposed, spaced-apart planar surfaces in parallel relationship to one another, planar, vertically disposed, spaced-apart parallel front and back surfaces, and in perpendicular disposition thereto, first and second vertically disposed, planar, spaced-apart, parallel sides intersecting said front and back surfaces, and a horizontally disposed cylindrical-shaped passageway extending through said body member from one of the said parallel sides to the other, an upstream and a downstream elongated fitting each having a centrally disposed passageway therein being provided on said Tee-connector and extending horizontally outwardly from and perpendicular to respective said vertically disposed sides in opposition to one another, said passageway in said elongated fittings being connected to and being coextensive in diameter with that passageway in said body member whereby to provide a continuous passageway for flow of sap, a third elongated fitting being provided on said Tee-connector and extending vertically upwardly a predetermined distance from and perpendicular to said top, horizontally disposed, planar surface of the body member and terminating in a plane parallel to said top planar surface, a centrally disposed passageway being provided in said third elongated fitting which extend from the end thereof into said body member and intersects perpendicularly with the horizontally disposed passageway provided therein, said third fitting being further defined by a vertically disposed circular-shaped perimeter terminating at its inner end at, and perpendicular to, a horizontally disposed, circular-shaped planar surface, a tapered surface connected to and extending downwardly from said horizontally disposed, circular-shaped, planar surface and tapering outwardly from the vertical at a predetermined angle terminating at said top, horizontally disposed planar surface of the said body member, a pair of diametrically opposed lugs being provided on said third fitting spaced apart from said top surfaces, each of which lugs extends outwardly from said circular-shaped perimeter a predetermined distance in horizontal disposition in a plane parallel to the plane defined by said top, planar surface, a supporting member for supporting said Tee-connector on, and fastening such to, a tree trunk of a maple tree extending vertically downwardly from and connected to the said bottom, horizontally disposed, planar surface of the body member and being defined by planar front and back planar faces which taper downwardly from said bottom surfaces at equal angles and intersect with one another, and parallel first and second, vertically disposed, planar sides, an opening being provided in and extending through said supporting member from one said tapered planar face to the other for location of a nail or like fastening means therein for fastening said Tee-connector to said tree trunk, a branch line conduit of flexible tubing of predetermined length connecting the downstream elongated fitting located on said Tee-connector to one of the plurality of fittings on the main line conduit connector, a spout member comprising a head defined by a vertically disposed face, a rear portion and a bottom portion, and an elongated spout having an open end connected to and extending outwardly in horizontal fashion from the said vertically disposed face of said head being located in a borehole provided in a maple tree, an elongated fitting interconnected to the head of the spout member at the said bottom portion and extending downwardly therefrom and rearwardly at an angle from the vertical for the attachment of a drop line to said spout member, centrally located axial passageways being provided in said spout and in said elongated fitting and intersecting with one another at their respective inner ends thereof whereby to provide a straight line passageway for flow of sap through said head, a drop line of predetermined length of flexible, plastic tubing having a spout end and a Tee-connector end connected to said elongated fitting on said spout member at the spout end and at the Tee-connector end to the said third fitting on said Tee-connector, a quick connect/disconnect fitting being provided at said Tee-connector end of said drop line having a female socket provided therein for mating with the lugs on said third fitting in bayonet-like fashion, and an upstream branch line of flexible, plastic tubing being connected at one end to said upstream fitting on the Tee-connector and being connected at its other end to the downstream fitting of another such Tee-connector located on the trunk of a second maple tree spaced apart from the said maple tree.

Quite advantageously there is provided by the invention a somewhat simplified sealed joint for use in readily connecting and disconnecting tubular fluid conducts or the like. Such joint members provide good tight seals in and of themselves without dependence on gaskets or other members.

BRIEF DESCRIPTION OF THE DRAWINGS

For a better understanding of the invention, reference should be had to the following detailed description of the invention which is to be read in conjunction with the accompanying drawings, in which.

DETAILED DESCRIPTION OF THE PREFERRED EMBODIMENTS OF THE INVENTION

Figure 1:
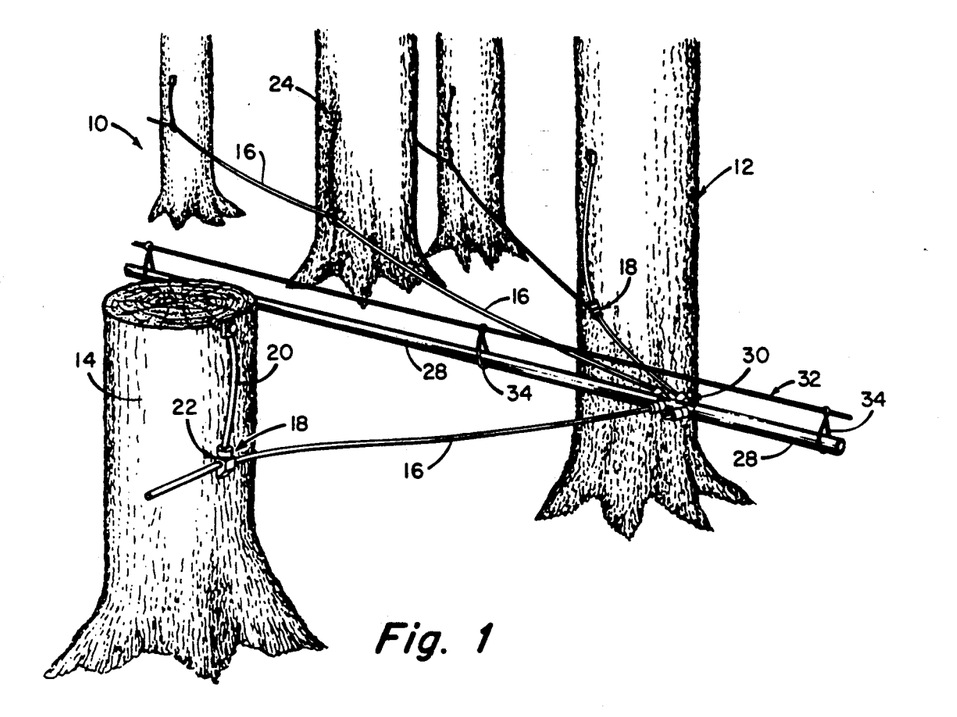
FIG. 1 is a schematic view of a portion of a grove of maple trees showing a part of a sap collection system according to the invention.

Turning now the the drawings, there is shown in FIG. 1 thereof a sugarbush, or orchard, indicated generally by reference numeral 10, comprising a plurality of spaced-apart maple, or other sap producing, trees 12, each of which has a tree trunk 14. Extending in horizontal disposition from each tree trunk 14, and connecting one next adjacent tree to another, are suitable lengths of branch line conduit 16. Such conduit is of flexible, plastic material such as polyvinyl chloride tubing of suitable diameter, e.g., five-sixteenths of an inch in diameter, and forms no part of this invention per se. This manner of tubing is now conventionally used in sap collection systems and may be clear or transparent, or of black color, as desired. Use of black tubing, according to the disclosure in U.S. Pat. No. 2,877,601, results in more rapid thaw-out of frozen sap lines, compared to water-white tubing. This is due to the fact, according to the patentee, that black bodies have relatively high heat absorbing properties. In some cases, however, the tubing now being used is of a transparent, e.g., green or purple, color which appears to provide characteristics that are a blend of those desired in the water white and black tubing, i.e., it allows observation of the sap flow, and absorbs some solar heat, contributing to thaw-out of frozen sap pockets. Nevertheless, the transparent green or purple-colored tubing is believed to adsorb less solar heat than a black tube which sometimes appears to cause the spots, which in turn cause, or at least contribute to, the build up of bacteria.

The lengths of branch line conduit 16 are connected together end-to-end, in serial fashion, by means of a Tee-connector or fitting 18, as shown in FIG. 1 of the drawing. As will be seen more clearly by reference to FIG. 6, connected to the Tee-connector 18 is a drop line 10, i.e., a short length of flexible, plastic tubing of the type used for the branch line conduit, the ends of which are connected, respectively, to female spike member or fitting 22 and spout member 24. The spout member 24 intrudes into borehole, or tap, 26 for collection of sap. The combination of the spout member 24, drop line 20, female spike 22, and Tee-connector 18 constitutes a drop line assembly in accordance with one aspect of the invention. As will be appreciated by reference to FIG. 1, the downstream, fee end of the last length of branch line conduit 16 is connected into the main line conduit 28 via a manifold connector 30. The downstream and upstream ends of adjacent lengths of main line conduit 28 are connected together through the manifold connector 30, as seen in FIG. 1. Although not shown in the drawing, it will be appreciated by those familiar with sap collecting systems that the main line conduit 28 carries the sap from the trees in the sugarbush from which sap is being collected to a central collection point, e.g., a storage tank, to be held for further processing according to conventional techniques. The ample sap is then transferred to arches and heated pans where it is then, according to usual techniques, concentrated to maple syrup, with removal of excess water. In some cases, the downstream end of the most downstream section of the main line conduit may, if desired, by connected into a vacuum or other pump (not shown), particularly if the terrain of the sugarbush is relatively flat, or gravity flow is insufficient for best operation of the system. The mainline conduit is of the same plastic material as the branch line conduit, however of somewhat greater diameter, e.g., $\frac{3}{4}''-1''$ being preferred, depending on the diameter of the manifold connectors.

Thus, there is provided, in accordance with a major aspect of the invention, a system for the collection of sap from maple trees, or other sap producing trees, comprising an interconnected network of branch line conduits 16 and a main line conduit 28 for transportation of sap to a central collection point for subsequent processing to maple syrup and sugar. The sap is collected from each tree 12 located in the system and is transported from the borehole 26 in that tree downwardly through a drop line assembly connected to the branch line conduit via means of a quick connect/disconnect assembly in accordance with a feature of the invention comprising the Tee-connector 18 and female spike 22. Other than as disclosed herein the sap collection system is conventional and well known to those skilled in the art. Therefore, there is believed to be no need for disclosure of other features of the collection system or the processing of the sap to maple syrup or other products.

The main line conduit 28, as will be appreciated by reference to FIG. 1, is supported and held in position, in conventional fashion, a suitable, predetermined distance above the ground by means of a wire cable system identified, in general, by reference numeral 32. Such a cable support system 32 for supporting the collection system is conventionally used and may be supported throughout the sugarbush 10 at desired locations by attachment according to usual technique to certain designated tree trunks, or to upright stakes or posts (not shown) provided specifically for this purpose. The main lie conduit 28 may be connected to and supported by the cable system by means of strap hangers 34, if desired, or by other suitable means. Other support means sometimes used are conventional double-headed nails driven into the upright support posts. With such nails the lines may be merely laid thereon or secured by strap hangers or the like fastening means. As will be appreciated, although not shown in the drawing for sake of clarity, the branch lines may also be supported, as desired. The primary consideration is that the sap collecting system be installed so that there are no sags in the main line and branch line conduits hereby avoiding the potential for the formation of stagnant areas of sap. Most desirably, the main line and branch line conduits will be installed in the collection system so as to provide a downward slope therein to the collection point, providing good flow characteristics for the running sap throughout the system, to the final collection point. To make certain the system is without sags, the conduit lines are conventionally stretched and made somewhat taut. While such stretching of the lines in a sap collection system is now commonly done, the positive locking feature of the Tee-connectors and other unique fittings and connectors of this invention, as hereafter more fully disclosed, allow for substantial tension to be placed on the lines being stretched. Thus, sags in the lines can be more positively eliminated. While, as earlier disclosed, the lines can be attached to the support system by any desired fastening means, such means should not, of course, interfere with the stretching of the lines to eliminate any sags therein.

Figure 2:
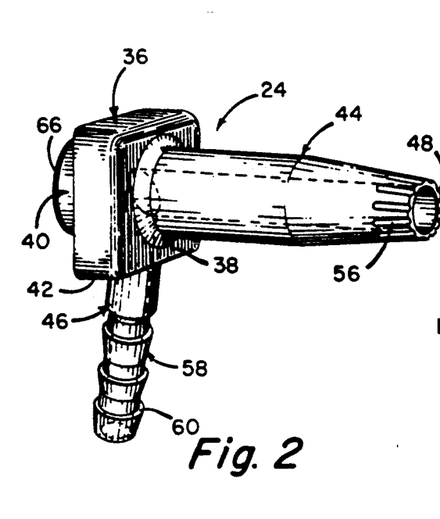
FIG. 2 is a perspective view of a spout member of the invention.
Figure 6:
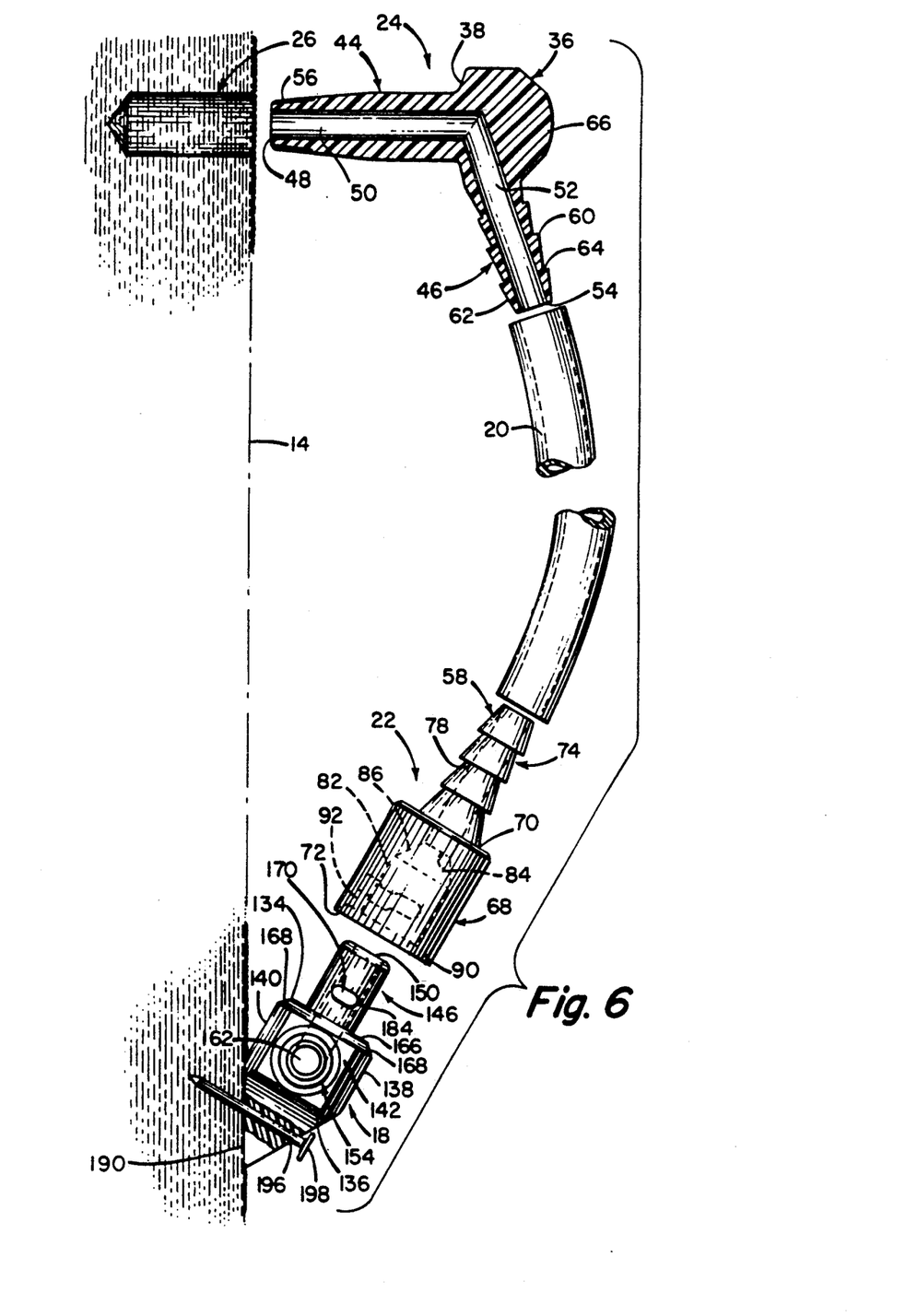
FIG. 6 is a side view of a drop line assembly according to the invention used in the sap collection system of the invention showing the respective locations on a maple tree of the components of the assembly during the sap collection period and showing in cross-section the novel spout member of the invention.

Spout member 24, as shown more clearly in FIGS. 2 and 6 of the drawing, comprises a head or body portion 36 defined by a vertically disposed planar face 38, a vertically disposed rear portion 40, and a horizontally disposed planar bottom portion 42, an elongated, circular-shaped spout 44 extending outwardly in horizontal fashion from the vertically disposed face 38, and an elongated, circular-shaped fitting 46 interconnected to the head of the spout member 24 at the bottom portion thereof, as shown in FIG. 6 The elongated spout 44 has an open end 48 of circular-shape into which sap flows when the spout member is located in the borehole 26 and which defines the axially disposed, circular-shaped passageway 50 in the spout. The passageway 50 terminates at its inner end in the head of the spout and communicates with the inner end of circular-shaped passageway 52 provided in the elongated fitting 46 which terminates in open end 54 of circular-shape and which defines the passageway 52. The elongated spout 44 is of a uniform, circular-shape for a predetermined distance outwardly from the vertical face 38 and then the perimeters of the spout tapers inwardly, as shown in the drawing, terminating at the circular-shaped opening 48 of somewhat lesser outside diameter. Thus, the spout can more easily be inserted into, and withdrawn from, borehole 26. Furthermore, the tapered surface will allow for good frictional engagement of the spout with the periperal surface of the borehole resulting in a good seal from the environment.

Extending inwardly from open end 48 a predetermined distance in the outer perimeter of the elongated spout and extending around the circumference thereof, preferably, are a plurality of spaced-apart longitudinal grooves 56. These grooves are believed to intercept and facilitate the flow of sap from the outer, sweeter part of the tree being tapped. Furthermore, the grooves 56 appear to help reduce plugging of the sap wood during sap flow.

Importantly, as will be readily appreciated by reference to FIG. 6, the axial passageways 50, 52 provide a straighter line for flow of the sap though the spout member of this invention than do such members of the prior art of which I am aware. Thus, the inner ends of the two passageways intersect with one another at an angle substantially greater than 90 degrees, e.g., most preferably an angle of from about 105-110 degrees. Such an angle between the spout 44 and the elongated fitting 46, moreover, makes easier the cleaning of the spout member and the removal of wood particles that may be trapped in the spout member and which may be carried along with the sap as it travels through the spout member.

The elongated fitting 46 on spout member 24 is provided with a plurality of circumferential ribs 58 each of which is defined by an inner end 60 which extends radially outwardly a predetermined distance from the peripheral surface defined by the elongated fitting and concave surface 62 that tapers inwardly toward the said peripheral surface of the open end 54 of the fitting. This surface terminates in an outer end 64 located directly adjacent and abutting the next rib 58 provided on the fitting. The outer end of the outermost rib terminates at the open end 54 of the elongated fitting. As will be appreciated by reference to the drawings, the inner end 60 provides a sharp corner or flange to better affect a reverse seal with any tubing connected therewith during times of positive internal pressure. The smooth concave surface of the rib provides for better sealing engagement with tubing and makes for easier installation of tubing on such a fitting than those used in sap collection systems heretofore. The elongated fitting 46 where it joins with the body portion 36 of the spout member is of somewhat greater diameter than at the open end 54 thereof. Thus, the elongated fitting is of somewhat greater strength than if not so tapered. The shape of the rear portion 40 of the spout member 24 approximates that of a frustum of a cone as will be appreciated by reference to FIG. 6, the outer surface 66 being only slightly rounded and providing a striking or bearing surface for installation of the spout member in the borehole. The spout member can desirably, sometimes at least, be installed by hand.

As will be appreciated by those skilled in the art of sap collection systems, the providing of the elongated fitting at a greater outwardly extending angle than heretofor with respect to the spout has the added advantage of facilitating the removal of the spout member from the tree at the end of the sap harvesting period. Such can be readily accomplished without need for tools, resulting in less breakage of spout members, by merely taking a hold of the spout member at its head and wrapping one's fingers around the elongated fitting and twisting the spout member back and forth in a clockwise-counterclockwise direction.

The overall size of spout member 24 according to the invention is similar to those now conventionally used, e.g., the spout is about 2 5/16" from the open end 48 to the rear portion 40, and the downwardly extending elongated fitting 46 extends about 1" below the bottom portion 42. In general, the passageways should be about ¼ inch in diameter with the passageway in the spout of somewhat greater diameter than that in the elongated fitting. The outer diameter of the spout should be about a ½ inch, tapering downwardly somewhat toward its open end, at a distance inwardly therefrom about 1". The grooves 56 should extend inwardly from the open end 48 of the spout about ¼" and be about 3/64" wide and deep. The number of grooves provided on the spout may vary somewhat and will depend somewhat upon the size of the spout but satisfactory results will generally be found when the grooves are spaced apart about ¼". The circumferential ribs should be about ¼" end to end, the inner and outer ends having diameters of about ⅜" and 19/64", respectively. The concave surface is defined by a radius of about ½". Nevertheless, as will be appreciated, such dimensions may be varied somewhat, if desired.

The drop line 20, as shown in FIG. 6, is connected at one end to the elongated fitting 46 located on the spout member 24 and at the other end thereof to female member or spike 22. Spike 22 comprises an elongated body member 68 defined by a circular-shaped perimeter and top and bottom, horizontally disposed, planar surfaces 70, 72, parallel to one another. Extending vertically upwardly and outwardly from said top planar surface 70 and in perpendicular disposition thereto, there is provided a centrally disposed elongated fitting 74 which terminates in circular-shaped open end 76 which, in turn, defines an axial alined passageway 78 (See FIG. 6) connecting with the said top surface 70. This elongated fitting is provided with a plurality of circumferential ribs 58 like those earlier described in the case of elongated fitting 46. As will be more readily appreciated by reference to FIG. 6, the diameter of the elongated fitting 74 is somewhat greater at its inner end than at its outer end providing good strength characteristics. Nevertheless, the diameter of passageway 78 is constant throughout its length.

In the bottom surface 72 of spike member 22, and extending inwardly thereof a predetermined distance vertically, there is provided a centrally disposed, circular-shaped end 80 which defines a circular-shaped axial alined passageway 82 of somewhat greater diameter than that of passageway 78, the reason for which will soon be made clear. The passageway 78 extends beyond the top surface 70 and into body member 678 a short distance, communicating at its inner end 84 with the inner end 86 (FIG. 6) of passageway 82. The inner end 86 is preferably of frusto-conical shape as seen more clearly in FIG. 6, the purpose for which will soon be made known. Nevertheless, instead of being frusto-conical, this end can be rounded, though less desired. Open end 80 terminates at and defines an outwardly extending planar circular-shaped surface 88 parallel to planar top surface 70 and which is of a predetermined lesser radius than that of body member 68. The outer periphery of surface 88 defines the inner end of planar surface 90 which tapers downwardly and outwardly therefrom at a predetermined angle and terminates at the outer peripheral surface of body member 68 at bottom planar surface 72.

Figure 4A:
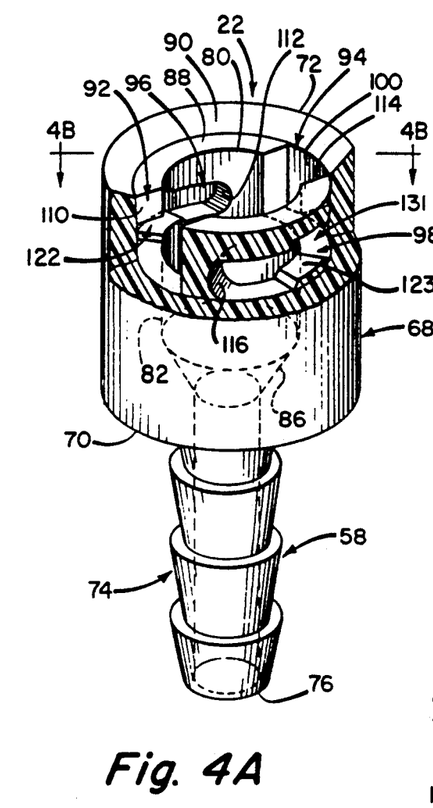
FIG. 4A is a view in perspective showing a female connector or spike member according to the invention used to connect a drop line to the Tee-connector shown in FIG. 3 with a portion of the body member thereof shown in section to better show the internally located grooves.
Figure 4B:
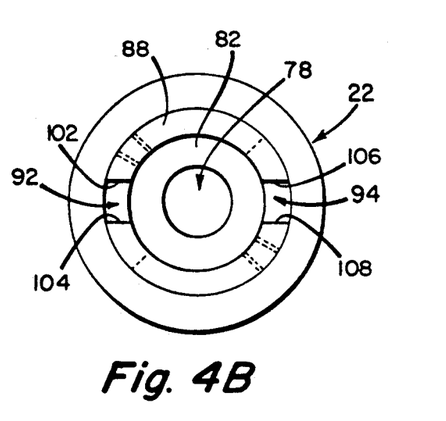
FIG. 4B is an end view of the female connector shown in FIG. 4A taken at the ned of the body member so as to better see the vertically disposed grooves extending inwardly into the body member from the end thereof.
Figure 5:
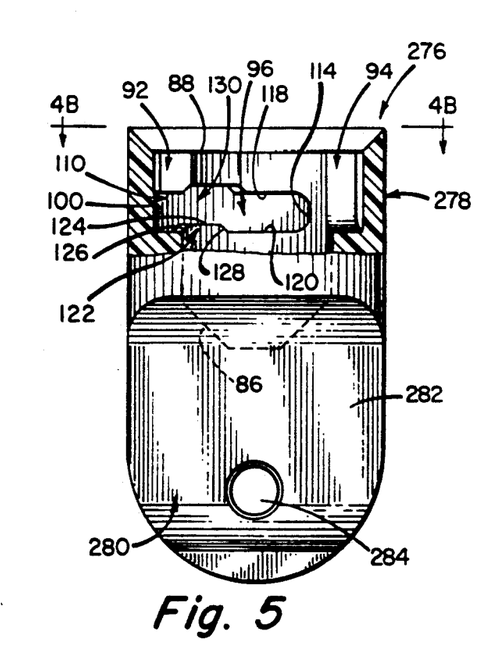
FIG. 5 is a side view in partial cross-section of an end cap for use in providing a closure on the vertically upright male fitting shown on the Tee-connector in FIG. 3 and in FIG. 6, when the drop line is disconnected from the sap collection system.

Extending inwardly a predetermined distance from end surface 88 are provided a pair of vertically disposed slots or grooves 92, 94 (FIG. 4A), located diametrically in opposition to one another. The inner end of these grooves terminate in a plane parallel to that defined by end surface 88. Grooves 92, 94 communicate at their inner ends with horizontally disposed, annular-shaped slots or grooves 96, 98, respectively, which are defined by passageway 82 on their inner side and on their outer side by outer circular-shaped wall 100 which is coextensive with the outer periphery of end surface 88. Vertically disposed grooves 92, 94 are defined further (FIG. 4B) by vertically disposed, spaced apart sides 102, 104 and 106, 108, respectively. As will be appreciated, the inner and outer defines of grooves 92, 94 are likewise defined by passageway 82 and the outer periphery of annular-shaped surface 88. The horizontally disposed grooves 96, 98 are disposed in opposition to one another and by outer and inner ends 110, 112 and 114, 116, respectively. The outer ends 110 and 114 are in the same planes defined by vertically disposed sides 102 and 108 of grooves 92, 94. The inner ends 112, 116 are of preferably rounded construction, as readily seen by reference to FIG. 5 wherein similar grooves are provided in the end cap hereinafter fully described. Horizontally disposed grooves 96, 98 are further defined by upper and bottom spaced-apart surfaces 118, 120 located in planar parallel to that defined by end surface 88. Referring to FIG. 5, for a somewhat further description of the grooves, it will be seen that a protrusion 122 extends outwardly from bottom surface 120 and vertically upwardly a predetermined distance, the reason for which will soon be disclosed. The protrusion 122 is defined by horizontally disposed planar top surface 124 and rounded or concave side edges 126, 128 which taper outwardly and downwardly from top surface 124, terminating at the horizontally disposed bottom surface 120. Those side edges 126, 128 also taper toward one from the outer edges of the protrusion 122 to its inner edge defined by the outer peripheral surface of axial alined passageway 82. In direct opposition to protrusion 122 there is provided in top surface 118 an indent 130, later more fully described. A similar protrusion 123 and indent 131 is provided in groove 98.

Female spike or connector 22 in use combines with the Tee-connector 18, as shown in FIG. 6, to provide a quick connect and disconnect assembly in accordance with a further aspect of the invention. Tee-connector 18, as will be best seen by reference to FIG. 3, comprises a body member 132 defined by top and bottom, horizontally disposed, planar surfaces 134, 136, in parallel relationship to one another, vertically disposed, parallel, front and back surfaces 138, 140, and first and second, planar, vertically disposed side members 142, 144. Connected to and extending outwardly and vertically upwardly from top surface 134 is a centrally disposed elongated, circular-shaped fitting or male member 146 which terminates in outer end 148 and defines an axially alined passageway 150 which extends inwardly into the body member 132 and communicates with a horizontally disposed passageway 152 extending between and connecting side members 142, 144. As will be appreciated from FIGS. 3 and 6, the outer end 148 is rounded or "ball" shaped whereby to from a tight, i.e., leakproof, seal when coming in contact and mating engagement with the frusto-conical shaped inner end 86 of passageway 82 in female spike 22.

Figure 3:
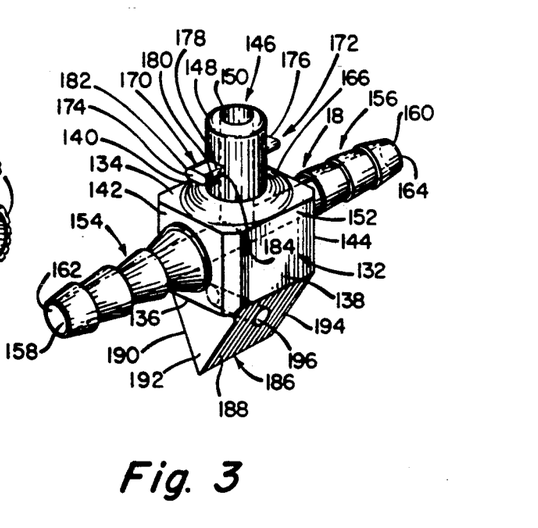
FIG. 3 is a perspective view of a Tee-connector in accordance with the invention.

Extending in horizontal disposition outwardly from respective side members 142, 144 and perpendicular thereto are centrally disposed first and second elongated fittings 154, 156 which terminate respectively in circular-shaped open ends 158, 160. These open ends 158, 160 define axially alined passageways 162, 164 which terminate respectively at side members 142, 144 and communicate with horizontally disposed passageway 152 providing a straight line path for flow of sap from one branch line 16 to another and from tree-to-tree. The elongated fittings 154, 156 are of like construction as elongated fitting 46 connected to spout member 24 and are each provided with a plurality of circumferential ribs for connecting the branch lines to the Tee-connector. The ribbed connectors of this invention provide improved sealing engagement over such ribbed connectors known heretofore which, apparently, results from the fact that the tubing better adheres to the curved surface provided on the ribs, as disclosed herein. The collection system is subjected to both negative and positive pressures during the sap harvesting season, positive when the sap is running and negative during the intermittent cycles; accordingly, it is important that the tubing connections be such as to be able to withstand any such pressures that develop so that the tubing will not be blown off the fitting resulting in wasted sap and downtime for repair of the system with attendant costs and loss in production.

The vertically disposed male fitting 146 terminates at its inner end and is centrally disposed on and perpendicular to horizontally disposed planar surface 166 having a circular shape of a predetermined diameter. Extending downwardly from the perimeter defined by circular-shaped surface 166 and at a predetermined angle from the vertical is a flange defining outwardly tapered surface 168 which terminates at it s lower peripheral end defined by a second predetermined diameter at horizontally disposed top planar surface 134 of the body member 132. Circular-shaped planar surface 166 is parallel to planar surface 132. Thus, when Tee-connector 18 and spike 22 are in mating engagement, as will be appreciated by reference to FIG. 6, tapered surface 168 will be in tight, sealing engagement with tapered surface 90. As a result, there is provided a further, outer seal between such mating members, protecting the joint formed therebetween from outside (weather) elements.

Located intermediate outer end 148 of elongated fitting 146 and circular-shaped surface 166 and extending horizontally outwardly therefrom in horizontal disposition and in opposition to one another are lugs 170, 172. These lugs extend outwardly equidistantly from fitting 146 and terminate in respective ends 174, 176. Each lug is defined by top and bottom, spaced-apart surfaces designated by reference numerals 178, 180, in the case of lug 170, connected together respectively by edges 182, 184 (lug 170) which are rounded, as shown more clearly in FIG. 6, so as to conform to the rounded inner ends in the horizontally disposed grooves 96, 98 in female spike 22, and for another purpose as will soon be made clear. The lug 172 is of the same construstion and does not, it is believed, need be further described herein.

Extending downwardly from the body member 132 and integral therewith is a supporting member 186 for detachably fastening the Tee-connector 18 to the trunk of the tree from which sap is being collected. Supporting member 186 is defined by planar front and back faces 188, 190 which taper inwardly toward one another at equal angles and intersect at a predetermined vertical distance downwardly from bottom surface 136, and vertically disposed parallel first and second spaced-apart sides 192, 914. Intermediate the bottom extent of the supporting member 186 and body member 132 there is provided an opening 196 which extends completely through the supporting member from the front face 188 to the back face 190. Thus, the Tee-connector can, as shown in the drawing, be detachably connected to the trunk 14 of a tree from which sap is being collected by a nail 198 or other elongated fastening means. Importantly, when the Tee-connector 18 is located on the tree, the tapered back surface 190 will necessarily direct the Tee-connector in a direction outwardly from the tree trunk, as seen in FIG. 6. Thus, spike 22 and Tee-connector 18 can be readily disconnected from one another without removal of the Tee-connector from the tree and another length of drop line connected thereto, if desired, or the tree can be isolated from sap harvesting, if desired, as later disclosed. Also of importance, the Tee-connector is so positioned on the tree that the quick connect assembly is directed upwardly so that the drop line 20 can be connected thereto without formation of a sag with attendant accumulation of stagnant sap during intermittent periods of flow. This can be readily accomplished no matter what the length of the drop line provided by merely tying the drop line against the tree trunk so that it provides downward flow to the connector. It will be appreciated, however, that one of the major advantages of this invention is that drop lines of different lengths can readily be provided for use when and as desired. The operator of the sugarbush can, if desired, keep on hand various lengths of drop line already fitted with spout member and female spike for use as needed.

In operation, the female spike 22 is associated with the Tee-connector 18 si such fashion that the lugs 170, 172 are lined up with the vertically disposed grooves 92, 94. The spike member and Tee-connector (male member) are then pushed together, to seat tapered surface 90 on tapered surface 168, and the two members are then rotated or twisted with respect to one another in opposite directions. Thus, the lugs 170, 172 are caused to travel horizontally in respective horizontally disposed grooves or slots 96, 98 (FIG. 4A) until the rounded edges of the lugs bottom against the respective inner rounded ends of the grooves. During such travel, and as the two members are rotated, the leading rounded edges of the lugs will encounter respective protrusions 122, 123 at which time the operator will experience a slight resistant to rotation. With a somewhat additional slight application of fore, the rounded edges of the lugs will be caused to ride up the tapered (or rounded) edges of the protrusions and over the top surfaces of each, down the reverse side of the protrusions, back into the groove and to the end thereof. Thus, the lugs provided on the fitting of the Tee-connector become trapped behind the respective protrusions in the horizontally disposed grooves of the female spike providing a positive locking feature to the assembly and preventing inadvertent separation of the two members from one another. Of some importance is the fact that during the rotation of the two members and joining them into interlocking engagement with one another, the operator will not only feel the meeting of the lugs with the respective protrusions, he will generally also be away of a faint clicking noise signaling that the lugs have met and passed over the respective protrusions and that the two members are in sealed, interlocking engagement with one another.

To provide an even tighter and more positive seal between the male and female members of the quick connect/disconnect assembly, the top and bottom surfaces of the horizontally disposed grooves or slots 96, 98 can be provided so as to describe a helix. Although the pitch of such a helix can vary somewhat, good results will be obtained in a helix having a pitch of from about 0.008" to about 0.031". Thus, as the lugs 170, 172 travel along the horizontally disposed grooves in the female spike, such travel will be along an ever increasing angle from the horizontal, resulting in the male member 146 of the Tee-connector being forced into ever tighter sealing engagement in the inner end 86 of the passageway in the female spike. Thus, the helix defined by the horizontally disposed grooves in the female spike causes the ball end 148 of the male member to be forced into ever tighter sealing engagement with the cone-shaped end 86 of the spike 22.

The extent of the rotation of the two interlocking members with respect to one another will depend, of course, on the length of the horizontally disposed grooves. In general, the one member will be rotated about ¼ turn with respect to the other member. Such will allow sufficient space for provision of the locking protrusions in the grooves and for providing a space in the grooves beyond the protrusions for entrapment of the lugs.

The dimensions of female spike 22 and T-connector 18 can be varied somewhat as desired. The main consideration is, of course, that the vertically an horizontally disposed grooves provided in the female spike be of such size as to accommodate the lugs 170, 172 provided on the Tee-connector 18, and that the angles generating the tapered surfaces 90 and 168 be such as to complement one another so that when the two members are in assembly with one anther, and in operative engagement, these tapered surface will being direct, sealing contact. In general, the body member 68 of the female spike 22 can have a diameter of about 13/16" and be about ⅞" in length, in which case the elongated ribbed connector will be about 1" long with 3 circumferential ribs provided thereon. The vertically disposed grooves can be about 3/16" wide extending inwardly into the body member about ¼". The horizontally disposed grooves can be about an ⅛" in depth and define an arc of about 105 degrees. The tapered surface 90 can be defined by an angle of about 45 degrees. In such a case, the body member 132 of the Tee-connector will be about 13/16" square having a depth of about 17/32". The tapered front and back faces 188, 190 can be defined by a 60 degree angle from the horizontal and extending downwardly from the body member about ⅝". The elongated fittings 154, 1546, like those described earlier, will each extend outwardly about 1" from the sides of the Tee-connector. The length of elongated fitting 146 can be about 37/64" and have a diameter about 13/32"; however, the main consideration is that its length and diameter be such as to e accommodated by the passageway 82 in the female spike 22. The rounded end of elongated fitting 146 can be generated from a radius of about 3/32" and will be seated in the frusto-conical shaped end 86 having an angle of about 30 degrees with respect to the horizontal. The lugs 170, 172, as earlier disclosed, should be of such dimensions as to be accommodated by the vertical and horizontally disposed bayonet slots on the female spike member of the quick connect assembly. In general, each lug will extend outwardly from the upright circular-shaped male member about ⅛" and have a width of about 3/16" and a depth vertically of about ⅛". The critical thing, however, is that such lugs each be so dimensioned as to fit into and travel as desired within the vertical and horizontally disposed grooves provided in the female spike 22, and without any hangup or binding. As earlier disclosed, the lugs 170, 172 are each provided with rounded edges so as to be able to slide over the protrusions located in the respective grooves 96, 98 which provide a predetermined obstacle to travel of the lugs and to the rotation of the two connecting members with respect to one another. Such obstacle, however, provides for the positive locking feature of the assembly in accordance with the invention, once the rotation or twisting action has been completed and the lugs have "clicked" into the locking position. It will be appreciated that the edges of the protrusions can be, if desired, of a slightly concave configuration to better conform to the rounded edges of the lugs and to allow for somewhat less resistance to movement of the lugs thereover. The protrusions are of a pie shape, i.e., wider at the outer edge thereof than at the inner edge. Thus, good results have been found where each protrusion measures about 3/32" at its outer edge, the side edges thereof tapering inwardly toward one another and terminating at the inner edge, i.e., at the periphery defined by passageway 82, and spaced apart from one another about 1/32". Nevertheless, it will be appreciated that these dimensions can vary somewhat to provide grater or less resistance to travel of the lugs in the respective grooves. In general, the side edges of the protrusions can be made less rounded or tapered, or the protrusions can be made to extend outwardly to a greater extent from the wall of the grooves, if greater resistance is required. Also, somewhat greater resistance will be provided if the protrusions are made somewhat less of a pie shape than disclosed herein. Whatever the dimensions and shape of the protrusions provided in the grooves, it will be appreciated that the indents provided in opposition thereto, provided on the opposite wall of the grooves will need be of such depth as to accommodate the lugs when they ravel over the top surfaces of the protrusions. Also, the indents will each need be wide enough from edge to edge thereof and located relative to the protrusions to accommodate the width of the lugs and to allow them to ride up the leading edge of the protrusion, travel along the top surface thereof, and to clear the trailing edge of the protrusion without hangup. The rounded or concave edges of the indents will, of course, be essentially the mirror image of those opposed edges on the protrusions. In practice, as the two members are twisted relative to one another, a leading edge of a lug will first encounter the leading concave edge of a protrusion and be caused to travel along that edge up to and over the top surface of the protrusion. A the same time, the bottom trailing edge of the lug will drop into the indent traveling along its leading rounded edge and along its bottom planar surface. The bottom leading edge of the lug will then encounter the concave or rounded trailing edge of the indent, causing the lug to ride thereup and back into and along the horizontally disposed groove until the leading edge of the lug encounters the rounded end of the groove. When the two members are rotated in the opposite direction with respect to one another, the reverse happens. On passing over the protrusions the lugs will encounter the inner ends of respective vertically disposed grooves. The two members can then be separated from one another by merely pulling each member in the opposite direction from the other. Although the indents and protrusions are shown in the drawings to be located on the top and bottom surface, respectively of the horizontally disposed grooves, it will be appreciated that such locations can be reversed, if desired, with the same function and results being obtained. Also, if desired, the horizontally disposed slots can be provided in opposite direction than disclosed in the drawings.

Figure 7:
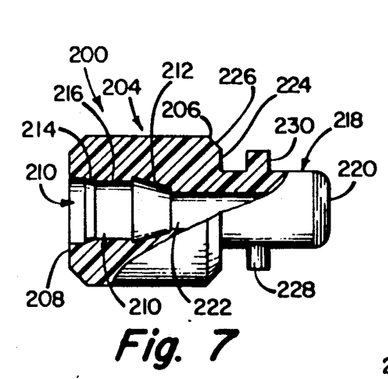
FIG. 7 is a side view with partial cut-away of an adaptor according to the invention which enables one of the presently installed sap collection systems using elongated fittings provided with a plurality of circumferential ribs thereon to be converted to one that can use the interchangeable quick connect/disconnect assembly and connectors and fittings according to this invention.
Figure 8:
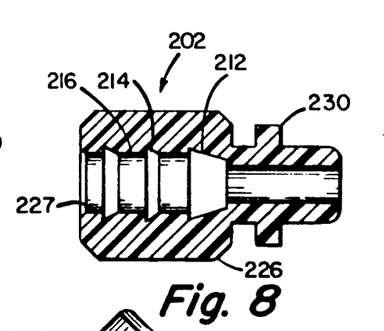
FIG. 8 is a side view in longitudinal section of another adaptor in accordance with the invention suitable for use in connecting together another elongated fitting of the prior art but one having an additional circumferential rib than that shown in FIG. 7.

In accordance with another aspect of this invention, reference should now be made to FIGS. 7 and 8 of the drawing wherein there are shown adaptors 200 and 202. Adaptor 200 is defined by an elongated body portion 204 of circular shape, a top planar surface 206 and a bottom planar surface 208 parallel thereto. Extending inwardly from the bottom planar surface 208, and centrally disposed therein is an axial alined passageway 210 of predetermined diameter. Provided along the passageway are circumferential indentations 212, 214 conforming in shade and dimensions to circumferential ribs provided on an elongated connector or fitting for plastic tubing. Such elongated ribbed fittings are well known and commonly now used in sap collection systems, their deficiencies prompting the invention is disclosed in this application. Fittings of this type are disclosed in U.S. Pat. Nos. 4,299,053 and 4,366,648, the disclosures of which are incorporated herein by reference. In general, however, these elongated fittings of the prior art are of frusto-conical shape as disclosed in FIG. 3 of U.S. Pat. No. 4,299,053. Furthermore, they are spaced apart along the elongated fitting so that each circumferential rib is separated from the next adjacent one by a portion of the peripheral surface defined by the diameter of the fitting. Thus, as disclosed in FIG. 7 of the instant drawings, there is provided in passageway 210 the inwardly tapered surfaces or indentations 212, 214 of frusto-conical shape separated by a circular-shaped surface 216 defined by the diameter of the passageway 210.

Extending vertically upwardly from and centrally disposed on top surface 206 of adaptor 200 is a male member or portion 218 of circular-shape comprising one member of a quick connect/disconnect assembly according to this invention, earlier described in some detail. Such member terminates at outer end 220 thereof and defines an axial alined circular-shaped passageway 222 extending inwarding into body portion 204 and communicating with passageway 210. The circular-shaped member 218 terminates at its inner end and is integral with circular-shaped planar surface 224 parallel to top surface 206. Extending downwardly and outwardly from the periphery defined by surface 224 is a flange defining tapered surface 226. Lugs 228, 230 extend outwardly from the male member 218 and are of like construction as those earlier described with respect to the male member 146 on T-connector 18.

Adaptor 202 is of similar construction as adaptor 200, except that a third circumferential indent 227 is provided herein. Those skilled in the art of sap collection systems will appreciate that the circumferential rib indents provided in the passageway in the adaptor body portion need not be the same in number or of the same exact configuration as those shown in FIGS. 7 and 8. Not only can a larger or smaller number of circumferential rib indents be provided in passageway 210, such indents can be of any particular configuration to accommodate elongated fittings provided with circumferential ribs known heretofore. For example, in U.S. Pat. No. 4,512,104, earlier disclosed, there is disclosed in FIG.2 thereof, the disclose of which is incorporated herein, an elongated fitting in which the circumferential ribs are of frusto-conical shape; however, next adjacent ribs on the fitting are, contrary to those other prior art ribs described earlier, in direct contact with one another without any separation therebetween.

The adaptors according to this invention will find ready use in converting an existing sap collection system to one as disclosed herein making use of the various connectors and fittings of this invention which incorporate the quick connect/disconnect feature disclosed. The elongated prior art ribbed fittings can be merely pushed into the corresponding adaptor provided in accordance with this invention to form a permanent connection therebetween. Nevertheless, if desired, better sealing engagement may be obtained in certain conversions by use of sealing materials and adhesives known to the those skilled in the art. It will be readily appreciated that the same double seal is formed when adaptor 200 or 202 is in mating engagement with spike 22 as earlier disclosed.

Figure 9:
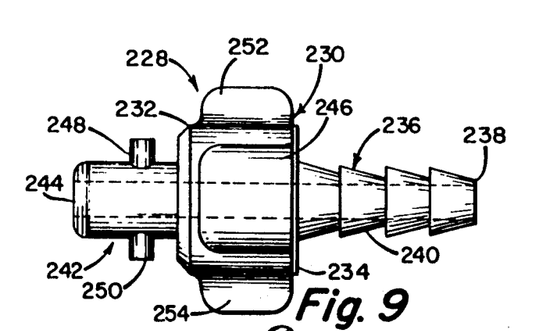
FIG. 9 is a side view of a male connector or spike member in accordance with the invention for use in connecting together the adjacent ends of two straight line pieces of conduit with a quick connect/disconnect assembly or connector member or fitting according to the invention.

In a further aspect of this invention there is provided a straight-through male spike or member 228 as disclosed in FIG. 9. The male spike 228 is defined by an elongated body member 230 of circular shape having a top planar surface 232 and a bottom planar surface 234 parallel to the said top surface. An elongated centrally disposed fitting 236 as previously described herein in reference to FIG. 6 having circumferential ribs provided thereon extends downwardly from the bottom surface, terminating at the outer circular-shape end 238. This end defines an axial alined passageway 240 which extend inwardly into body member 230. Extending outwardly from top surface 232 of the male spike is a male connector or member 242 of a construction like that earlied described. Male connector 242 terminates at its outer end and defines a circular-shaped passageway 244 which extends inwardly into the body member 230 and communicates with passageway 240 of like diameter. Thus, if desired, there can be provided a quick connect/disconnect connection in a straight line, e.g., between two branch line conduits, using this male spike and a female spike such as disclosed in FIG. 4A.

As disclosed in FIG. 9, the body member 230 can be provided, if desired, with diametrically opposed, parallel, flat surfaces, only one of which si sown in the drawing and denoted by reference numeral 246. Such flat surfaces will define planes parallel to and located equidistantly from a plane bisecting the male spike or elongated fitting 228 longitudinally and which extends through and divides in half the opposed lugs 248, 250. Thus, these flat surfaces will serve as a label for the operator allowing automatic, rapid ergonomic joining of a male spike with a female spike 22 or other female fitting disclosed herein regardless of the weather conditions or light available. These labels will also facilitate the assembly of the two members together under cold conditions when the operator is wearing gloves. Such labels should also be provided on the body member of the female spike or connector in such a manner that the flat surfaces are provided in planes parallel to a plane bisecting the vertically disposed grooves. If desired, other labels can be provided on the male or female members of the quick connect and disconnect assembly. For example, in FIG. 9, there are shown lugs or protrusions 252, 254 provided on the body member 230. These lugs extended outwardly from the body member and in diametric opposition to one another. Lugs 252, 254 are provided in a plane bisecting the male spike longitudinally and the lugs 248, 250 provided on the male member 242. Labels such as lugs 252, 254, where and if desired, can be appropriately located in complimentary fashion on other mating fittings and connections disclosed in this application.

Figure 10:
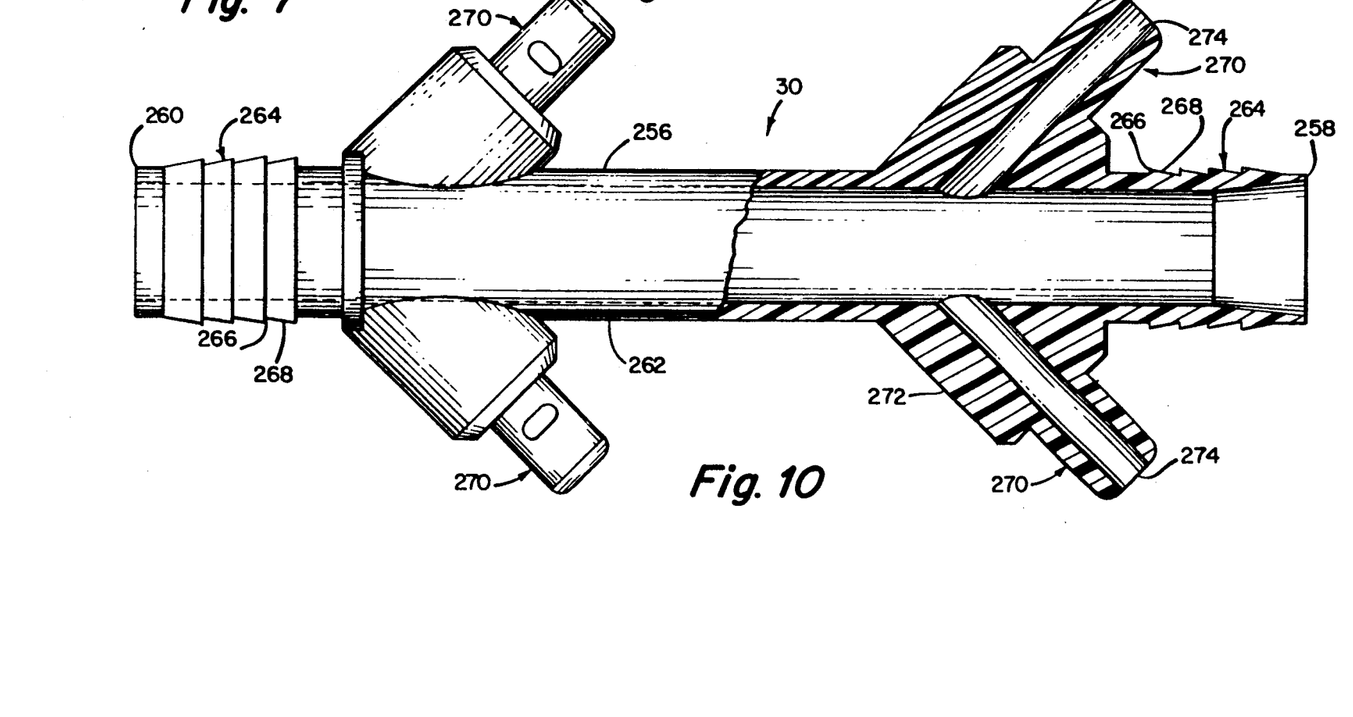
FIG. 10 is a top plan view in partial cross-section of a manifold connector according to the invention used in connecting together the adjacent ends of two sections or lengths of a main line conduit and for connecting four branch line conduits of somewhat smaller diameter of the main line conduit, such connector being provided with the male member of the quick connect/disconnect assembly according to one aspect on the invention.

Now referring to FIG. 10, there is disclosed a manifold connector 30 for connecting the ends of mainline conduit 28 as shown in FIG. 1 of the drawing. Manifold connector 30 comprises an elongated, cylindrical-shaped body member 256 having an upstream, circular-shaped open end 258 and a downstream, circular-shaped, open end 260 defining an axial alined passageway 262 therein communicating with the open ends. Provided on the outside surface of the body member 256, adjacent each end thereof, are a plurality of circumferential ribs 264. The ribs are each defined by an outwardly extending circular-shaped inner end 266 of somewhat greater diameter than that of the body member 256 and a slightly concave peripheral surface 268 which extends toward the respective ends of the manifold connector and terminates at an outer end having the same diameter as the body member. In general, the circumferential ribs 264 will be of like dimension; however, if desired, the outermost rib in the series of ribs can be provided inwardly somewhat from the respective open end of the connector, as shown in FIG. 10. Otherwise, the ribs will be directly adjacent one another, i.e., the outer end of a rib will directly about the inner end of the next adjacent circumferential rib provided on the connector.

The manifold connector 30 sown in FIG. 10 is provided with four male connector members 270 such as earlier disclosed herein for providing one member of the quick connect/disconnect assembly in accordance with the invention. Each of such male connectors is integrally connected at its bottom to a portion 272 of the manifold which extends outwardly therefrom at an angle less than 90 degrees and directed toward the upstream end of the connector. As shown in the drawing, the male connectors 270 are provide din directly opposed pairs, the axial passageways 274 therein communicating with the passageway 262 in the manifold connector which is of somewhat larger diameter than the diameter of passageways 274 to accommodate the incoming flow of sap from the branch line conduits. It will be appreciated that, although the manifold connector 30 in FIG. 10 is shown to be provided with four male connector members according to the invention, that such is not critical to this aspect of the invention. The manifold connector can have more or fewer such connectors as desired. Although the connector members 270 in FIG. 10 are disclosed to be in pairs and in opposition to one another, i.e., in the same plane, such need not be the case. Other configurations can be constructed as desired. Moreover, a connector for merely connecting two lengths of mainline conduit together can be provided without any male connectors thereon, making use only of the novel circumferential ribs as disclosed herein.

Referring now to FIG. 5 of the drawing, there is seen therein an end cap 276 having a circular-shaped body member 278 and a thumb-finger gripping portion 280. The body member 278 is of the same configuration as the body member 68 of the female spike 22 disclosed earlier herein and, accordingly needs no further detailed description. Body member 278 is provided with the same bayonet grooves as earlier described and as defined by reference numerals 92, 94 and 96, 98 allowing for assembly with the lugs on the male member 146 of a T-connector or those on the male member 242 of a male spike 228, or with any such members on the manifold connector, as desired. Thus, with such an end cap, any portion of the sap collection system while still installed on the trees can be sealed off, or isolated, as desired. The thumb-finger gripping portion 280 is provided with two, parallel, opposed flat surfaces, only one of which is shown in the drawing (FIG. 5), referred to, in general, by reference numeral 282. These flat surfaces provide a label to the operator, as earlier disclosed, and are alined with respect to the body member 278 to allow automatic ergonomic alignment with any connector having a male fitting, e.g., the Tee-connector 18. Thus, any such members of the invention which in combination constitute a quick connect/disconnect assembly can be readily connected together under nay environmental conditions, if provided with such label means as disclosed herein. It will be appreciated that in order to accomplish this feature, though not specifically shown in the drawing, that the flat surface don the thumb-finger gripping portion 280 will define plans parallel to one another and to a plane bisecting the vertically disposed grooves in the body member and equidistant on each side thereof. If desired, an opening 284 can be provided in the thumb-finger grip 280 for location of identifying means such as a hang tag. Thus, the operator can merely tie a tag onto the end cap which identifies the tree by number or other purpose.

The various fittings and connectors disclosed herein constitute a family of interchangeable fittings suitable for use in the installation of sap collection systems, or in the conversion of existing systems to one as disclosed herein. The various fittings can be manufactured by conventional molding techniques and from various plastic materials, e.g., nylon, polyvinyl chloride resins ABS resins, Delrin polyacetal resin, etc. known to the art. These plastic compositions can include various filters usually provided in such composition to obtain the optimum physical properties. Preferably the fittings will be of a clear or transparent material enabling the operator of the sugarbush to observe the sap flow and, importantly, to readily determine the location of any problems in the system, e.g., blockages caused by wood particles, frozen sap pockets, etc. so that such problems can be more readily corrected than with existing systems.

As usual, the fittings can be provided, fi desired, with rounded, or cut-off, corners where tow surfaces come together, as shown in the drawings to facilitate their extraction from the mold. In other cases, a fitting may be provided with an undercut portion for the same purpose according to usual molding techniques. The sizes given above are merely by way of example and may be varied, as desired, to obtain optimum functioning or manufacture.

The use of the various fittings disclosed herein in the installation or modification of a sap collections system needs, it is believed, no further explanation. Such a system can be readily and easily installed and when so installed will result in an interconnected air and water tight system capable of withstanding pressures not heretofore endured. Thus, a sap collection system in accordance with this invention can, in general, withstand air and water pressures in the order of 100 lbs/in$^2$, allowing for use of high pressure cleaning systems in the cleaning of sanding installations without danger of fittings being blown off. During such cleaning the drop line will be disconnected from the Tee-connector and such will be capped off with an end cap as disclosed herein to provide a closed system. With the ease provided by the quick connect/disconnect fittings according to this invention, one can readily provide a drop line of any length needed to reach to a new borehole provided in a particular tree. Thus, use of the family of fittings of this invention should, over time, lead to healthier trees and a more productive sugarbush. The end cap 280 of the invention provides ease in the isolation of any portion of a sugar bush, or any particular trees in the sugarbush. This can readily be accomplished by disconnecting the drop line from the Tee-connector and replacing the female spike connected thereto with the end cap. Both the female spike and the end cap are provided with the same female connectors, i.e., the bayonet grooves, for the male member on the Tee-connector, making the fittings interchangeable with one another. The spout member and drop line. i.e., the drop line assembly according to the invention, can then either be placed in storage for later use, or cleaned, or used on another tree. At the end of the sap collection season, the system can be easily disassembled, if desired, making it possible to store the system from one season to the next. Such is particularly of advantage in preventing destruction from animals traversing the sugarbush and falling trees and limbs. At such time the system can be cleaned and prepared for installation the next season. If desired, however, the branch lines can be left installed in the sugarbush and cleaned in place with conventional high pressure cleaning systems. Prior to doing so, however, all drop lines should be disconnected and the Tee-connector desirably capped with an end cap, as provided herein. If desired, a branch line can be sealed off, or isolated from the rest of the system by use of a male spike, as disclosed earlier. Thus, the entire collection system in place can be sealed off with no fittings left open or exposed to he environment between sugaring seasons, to attract insects, which frequently plug the fittings and lines with dirt, mud, and other debris and which is often difficult to detect and remove. Moreover, providing a closed system in accordance with this invention will help prevent contaminating agents, bacteria, etc. from coming into contact with the maple sap, a highly desirable objective as such is a food product.

Existing sap collecting systems can be readily and with ease converted to a system using the quick connect/disconnect assembly and fittings according to this invention. Thus, one merely need place an adaptor according to the invention over the existing elongated fitting. Once such is accomplished, the various fittings of this invention can be used.

A further feature of this invention is that such lends itself to the providing of a kit for the installation or modification of a sap collection system. Such a kit, in general, will comprise a plurality of the spouts, female spikes, male spikes, manifold connectors, and end caps having the construction of those provided by this invention. The size of the kit, i.e., the number of fittings provided herein may, of course, depend upon the number of trees in the sugarbush. If the purpose is to convert an existing system to one using the fittings disclosed herein, the kit will also contain a plurality of appropriate adaptors. In addition, the kit provided may include one or more rolls of plastic tubing of use as branch lines and mainline conduit. Or such tubing can be provided in predesignated lengths. Where provided in rolls, a suitable length can be extracted therefrom, cut off and used for installation of the branch lines by use of the Tee-connectors disclosed herein. Importantly, however, drop lines of different lengths as desired for best tapping can be used in making up suitable drop line assemblies, e.g., lengths of 36", 30", and 18" can be prepared in advance. Such drop lines can then be used anywhere in the system desired as such are completely interchangeable with one another. For example, this ear a given tree may require a drop line that would be ideally 36" long. The next year that same tree, because of the location of the new tap hole may require an 18" long drop line. Such a different length can be readily provided, however, either from inventory or from a tree requiring a different length.

While the present invention has been described in connection with the collection of maple sap, it will be appreciated by those skilled in the art that many features of the system can be advantageously employed in the collection of sap from other trees or vegetation capable of exerting hydraulic pressure in the manner of sap producing maple trees. Furthermore, various of the components, e.g., the quick connect/disconnect connectors and fittings, used in the sap collection system disclosed herein will find application in other tubing systems wherever positive sealing and a quick connect-/disconnect feature is desired. Thus, for example, the various connectors and adaptors disclosed herein can be used in various other field of endeavor, e.g., in the medical field, in hospitals where tubing systems are used to dispense liquid medicine, in chemical plants involving conduit for liquids, in gas line connectors and in the fuel industry, in the home, etc. It will be further appreciated hat the broad aspects of the invention will find application wheresoever two members need be connected/disconnected together in rapid fashion, whether or not such members are of tubular configuration. It will also be appreciated that other shaped connectors than those disclosed herein can be provided with the quick connect/disconnect feature. For example, the ends of a connector in the shape of a 90 degree elbow can be provided with either the male or female component disclosed. Or one end can be provided with the male fitting and the other with the female fitting. The fitting may take other than a 90 degree angle. The fitting provided with the quick connect/disconnect members may be in the shape of Tee other than as disclosed earlier and have one member of the assembly provided on each open end.

Other modification and changes, as will be understood by those skilled in the art, can be made in the invention and its form and construction without departing from the spirit and scope thereof. The embodiments of the invention disclosed therein are merely exemplary of the various modifications that the invention can take and the preferred practice thereof. It is not, however, desired to confine the invention to the exact construction and features shown and describe herein, but it is desired to include all such as properly come within the spirit and scope of the invention disclosed.

What I claim is:

1. A Tee-connector suitable for use in a sap collecting system comprising a body member defined by top and bottom, horizontally disposed, planar surfaces in parallel relationship to one another, planar, vertically disposed, parallel front and back surfaces, and first and second, vertically disposed, parallel sides intersecting with the planes defined by the said front back surfaces, first and second elongated fittings being provided on the said body member and in direct opposition to one another and extending from and connected respectively to said first and second, vertically disposed sides for connection of the ends of flexible, plastic tubing hereto, a horizontally disposed cylindrical-shaped passageway extending through said body member and said first and second, elongated fittings and terminating in and defining open end sin said fittings, a third, centrally disposed fitting being provided on said body member and extending outwardly therefrom a predetermined distance and being perpendicular to the said top, horizontally disposed, planar surface of said body member, an axial cylindrical-shaped passageway being provided in said third fitting and extending into said body member and intersecting with said horizontally disposed passageway, and a supporting member extending downwardly from the said bottoms surface of the said body member for detachably fastening the Tee-connector to the trunk of a tree from which sap is being collected, said downwardly extended supporting member being defined by planar front and back faces which taper downwardly and intersect with one another, and a parallel first and second, vertically disposed, planar sides, an opening being provided in said downwardly extending member and extending through said member from one planar tapered face to the other whereby a nail or like fastening means can be inserted for fastening said Tee-connector to a tree from which sap is being collected and whereby said third fitting on said Tee-connector will be directed away from the trunk of said tree and said third fitting will be directed vertically upwardly for connection of a drop line extending downwardly from a spout member.

2. A Tee-connector suitable for use in a sap collecting system comprising a body member defined by top and bottom, horizontally disposed, planar surfaces in parallel relationship to one another, planar, vertically disposed, parallel front and back surfaces, and first and second, vertically disposed, a parallel sides intersecting with the planes defined by the said front and back surfaces, first and second elongated fittings being provide on the said body member and in direct opposition to one another and extending from and connected respectively to said first and second, vertically disposed sides for connection of other ends of flexible, plastic tubing thereto, a horizontally disposed cylindrical -shaped passageway extending through said body member and sad first and second, elongated fittings and terminating in and defining open ends in said fittings, a third, centrally disposed fitting being provided on said body member and extending outwardly therefrom a predetermined distance and being perpendicular to the said top, horizontally disposed, planar surface of said body member, an axial cylindrical-shaped passageway being provided in said third fitting and extending into said body member and intersecting with said horizontally disposed passageway, and said third fitting being further defined by a vertically disposed, elongated, circular-shaped member having an outer and inner end, said third fitting terminating at its inner end in a horizontally disposed base provided on said top, horizontally disposed, planar surface of the said body member, said base comparing an upper, horizontally disposed, circular-shaped, planar surface of a predetermined diameter defining a perimeter and a flange extending downwardly from said perimeter and outwardly at a predetermined angle from the vertical terminating at the said top surface of the body member and defining a planar, outwardly tapered surface, and a supporting member extending downwardly from the said bottom surface of the said body member for detachably fastening the Tee-connector to the trunk of a tree from which sap is being collected.

3. A Tee-connector according to claim 2, wherein diametrically located lugs are provide don said third fitting extending outwardly in horizontal disposition therefrom and in a plane parallel to the top planar surface of said body member and spaced apart herefrom a predetermined distance, said lugs being adapted for operative mating connection in bayonet-like fashion in a mating fitting comprising diametrically opposed, vertically disposed, elongated grooves terminating in diametrically opposed, horizontally disposed grooves.

4. A Tee-connector according to claim 3 wherein a plurality of circumferential ribs are provide don said first and second, elongated fittings, each of said ribs being defined by a surface that slopes inwardly in concave fashion and outwardly to the open end of the respective fitting.

5. A Tee-connector according to claim 4 wherein said Tee-connector comprises a transparent plastic material.

* * * * *